(12) United States Patent
Kato

(10) Patent No.: US 6,431,608 B1
(45) Date of Patent: Aug. 13, 2002

(54) HIGH PRESSURE FUEL INJECTION PIPE FOR DIESEL ENGINE

(75) Inventor: Nobuo Kato, Shizuoka Prefecture (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 09/612,639

(22) Filed: Jul. 7, 2000

(30) Foreign Application Priority Data

Jul. 9, 1999 (JP) ............................................ 11-196318

(51) Int. Cl.$^7$ ................................................ F16L 55/00

(52) U.S. Cl. .................... 285/13; 285/14; 285/334.1

(58) Field of Search .............................. 285/13, 14, 93, 285/354, 334.1, 334.5

(56) References Cited

U.S. PATENT DOCUMENTS

| | | | | |
|---|---|---|---|---|
| 3,584,900 A | * | 6/1971 | Lennon et al. | 285/341 |
| 4,422,675 A | * | 12/1983 | Norris et al. | 285/45 |
| 5,094,480 A | * | 3/1992 | Boileau | 285/14 |

FOREIGN PATENT DOCUMENTS

| | | | |
|---|---|---|---|
| CZ | 72365 | * 11/1943 | 285/354 |

* cited by examiner

*Primary Examiner*—Eric Culbreth
(74) *Attorney, Agent, or Firm*—Anthony J. Casella; Gerald E. Hespos

(57) ABSTRACT

The invention is to provide a high pressure fuel injection pipe for a diesel engine wherein a fuel, leaked from a seat port is discharged to the outside of a head cover without leaking into the head cover so that a leakage of fuel can be promptly detected and is directed to the high pressure fuel injection pipe formed by abutting and engaging a pressure portion formed on a connecting head of a fuel injection pipe body to a pressure receiving seat portion of a counterpart member so as to provide a firm connection of the fuel injection pipe body to the counterpart member by screwing a fastening nut to press the connecting head to the counterpart member, wherein an annular washer having at least one groove or through hole formed in a radial direction on the circumference of the washer and a seal member is disposed in the vicinity of an outer end portion of a threaded engagement potion defined between the fastening nut and the counterpart member so that a fuel leaked into the inside of the fastening nut from a seat portion defined between the pressure seat portion formed on the connecting head and the pressure receiving seat of the counterpart member may be discharged to the outside through the groove or through hole. Alternatively, the leaked fuel may be discharged to the outside through a through hole which is formed on the fastening nut.

5 Claims, 6 Drawing Sheets

HIGH PRESSURE FUEL INJECTION PIPE FOR DIESEL ENGINE

BACKGROUND OF THE INVENTION

1. Field of the Invention

The present invention relates to a high pressure fuel injection pipe for a diesel engine having a small tubular diameter of approximately not more than 30 mm which is arranged in the vicinity of a diesel engine as a fuel supply passage specially in the field of a diesel engine, and more particularly to a high pressure fuel injection pipe for a diesel engine which is characterized by its connection structure with a counterpart member such as a nozzle holder.

2. Related Art Statement

As shown in FIG. 10 as an example, a nozzle holder side of a high pressure fuel injection pipe for a diesel engine is constituted such that an injection pipe body 21 is provided with a connecting head 21-1 at an end portion thereof and a fastening nut (generally called "hole bolt") 23 is assembled to the injection pipe body 21 by way of a press member 22 such as a washer which is disposed behind the connecting head 21-1, and a press seat portion 21-Ia formed on the connecting head 21-1 of the injection pipe body 21 is brought into contact with and is engaged with a pressure receiving seat portion 24a of a nozzle holder 24, and the injection pipe body 21 is connected to the nozzle. holder 24 by fastening with a pressing force applied to the connecting head 21-1 due to the threaded engagement of the fastening nut 23 with the nozzle holder 24. In FIG. 10, numeral 25 indicates a seal member and numeral 26 indicates a head cover of an engine.

However, the above-mentioned press member 22 is not always required to be provided. Therefore, the fuel injection pipe can be formed without provision of the press member, wherein a neck part below the connecting head 21-1 is directly fastened by the fastening nut 23 to connect with the nozzle holder 24.

In such a conventional high pressure fuel injection pipe, however, when fuel leaks into the inside of the fastening nut 23 due to flaws present on a seat face defined between the press seat portion 21-1a of the connecting head 21-1 of the injection pipe body 21 and the pressure receiving seat portion 24a of the nozzle holder 24 or the shortage of the fastening torque of the fastening nut 23 or the failure to fasten the fastening nut 23, the leaked fuel is leaked out into the inside of the head cover 26 through the threaded engagement portion between the fastening nut 23 and the nozzle holder 24. Accordingly, there have been problems that an engine oil is diluted (dilution) thus degrading the quality of the oil and simultaneously the oil level is elevated thus producing a white fume in an exhaust gas and increasing toxic substances in the exhaust gas. Further, conventionally, the leakage of the fuel through the seat face can be detected only by way of the recognition of the above-mentioned white fume so that it has been impossible to take a prompt countermeasure against the leakage of the fuel.

The present invention has been made in view of the above-mentioned drawbacks of the prior art and it is an object of the present invention to provide a high pressure fuel injection pipe for a diesel engine which is capable of detecting the leakage of fuel from a seat portion such that in case the fuel is leaked from a seat face defined between a press seat surface of a connecting head of an injection pipe body and a pressure receiving seat portion of a counterpart member such as a nozzle holder by a chance, the leaked fuel is led to the outside of a head cover.

SUMMARY OF THE INVENTION

The first aspect of the present invention is directed to a high pressure fuel injection pipe for a diesel engine which is constituted such that an injection pipe body is provided with a connecting head at an end portion thereof and a fastening nut is assembled to the injection pipe body by way of a press member which is disposed behind the connecting head, and a press seat portion formed on the connecting head of the injection pipe body is brought into contact with and is engaged with a pressure receiving seat portion of a nozzle holder which works as a counterpart member, and the injection pipe body is connected to the nozzle holder by fastening with a pressing force applied to the connecting head due to the threaded engagement of the fastening nut with the nozzle holder, wherein the improvement is characterized by being constituted such that an annular washer provided with at least one recessed groove or one small hole which extends in the radial direction on a circumference thereof is used as the press member which is interposed between the connecting head of the injection pipe body and the fastening nut, and fuel leaked into the inside of the fastening nut from a seat portion defined between the press seat portion formed on the connecting head and the pressure receiving seat portion of the counterpart member is led to the outside through the recessed groove or the small hole of the washer.

The second aspect of the present invention is directed to a high pressure fuel injection pipe for a diesel engine which is constituted such that an injection pipe body is provided with a connecting head at an end portion thereof and a fastening nut is assembled to the injection pipe body by way of a press member which is disposed behind the connecting head, and a press seat portion formed on the connecting head of the injection pipe body is brought into contact with and is engaged with a pressure receiving seat portion of a nozzle holder which works as a counterpart member, and the injection pipe body is connected to the nozzle holder by fastening with a pressing force applied to the connecting head due to the threaded engagement of the fastening nut with the nozzle holder, wherein the improvement is characterized by being constituted such that a through hole or a radially extending groove for leading fuel leaked into the inside of the fastening nut from a seat portion defined between the press seat portion formed on the connecting head and the pressure receiving seat portion of the counterpart member to the outside is formed in the fastening nut in the vicinity of the press member.

The third aspect of the present invention is directed to a high pressure fuel injection pipe for a diesel engine, which is constructed such that a press seat portion formed on the connecting head of the injection pipe body is brought into contact with and is engaged with a pressure receiving seat port of a nozzle holder and is fastened with a pressing force applied to the connecting head due to the threaded engagement of the fastening nut so as to connect the nozzle holder to the connecting head, wherein a through hole is formed in the vicinity of the connecting head of the fastening nut, the through hole of which being to discharge to the outside a fuel leaked into the fastening nut from the pressure receiving seat and the pressure receiving set portion of the nozzle holder.

Further, in the present invention, if necessary, a seal member may be disposed in the vicinity of an outer end portion of a threaded engagement portion defined between the fastening nut and the nozzle holder.

In the high pressure fuel injection pipe for a diesel engine according to the present invention, the annular washer having the radially extending groove or small hole is used as the press member interposed between the connecting head of the injection pipe body and the fastening nut, or the through hole is formed in the fastening nut per se, and the seal member is preferably disposed in the vicinity of the outer end portion of the threaded engagement portion defined between the fastening nut and the nozzle holder. Accordingly, the leakage of the fuel leaked from the seat face defined between the press seat portion of the connecting head of the injection pipe body and the pressure receiving seat portion of the nozzle holder into the inside of the head cover can be prevented and simultaneously the leaked fuel can be led to the outside of the head cover so that the leakage of the fuel caused by the abnormal condition of the seat face, the shortage of the fastening torque of the fastening nut or the failure to fasten the fastening bolt can be instantly detected in a trial operation after assembling an engine whereby the countermeasure against the leakage of the fuel can be taken promptly.

DETAILED DESCRIPTION OP THE PREFERRED EMBODIMENTS

Figure 1:
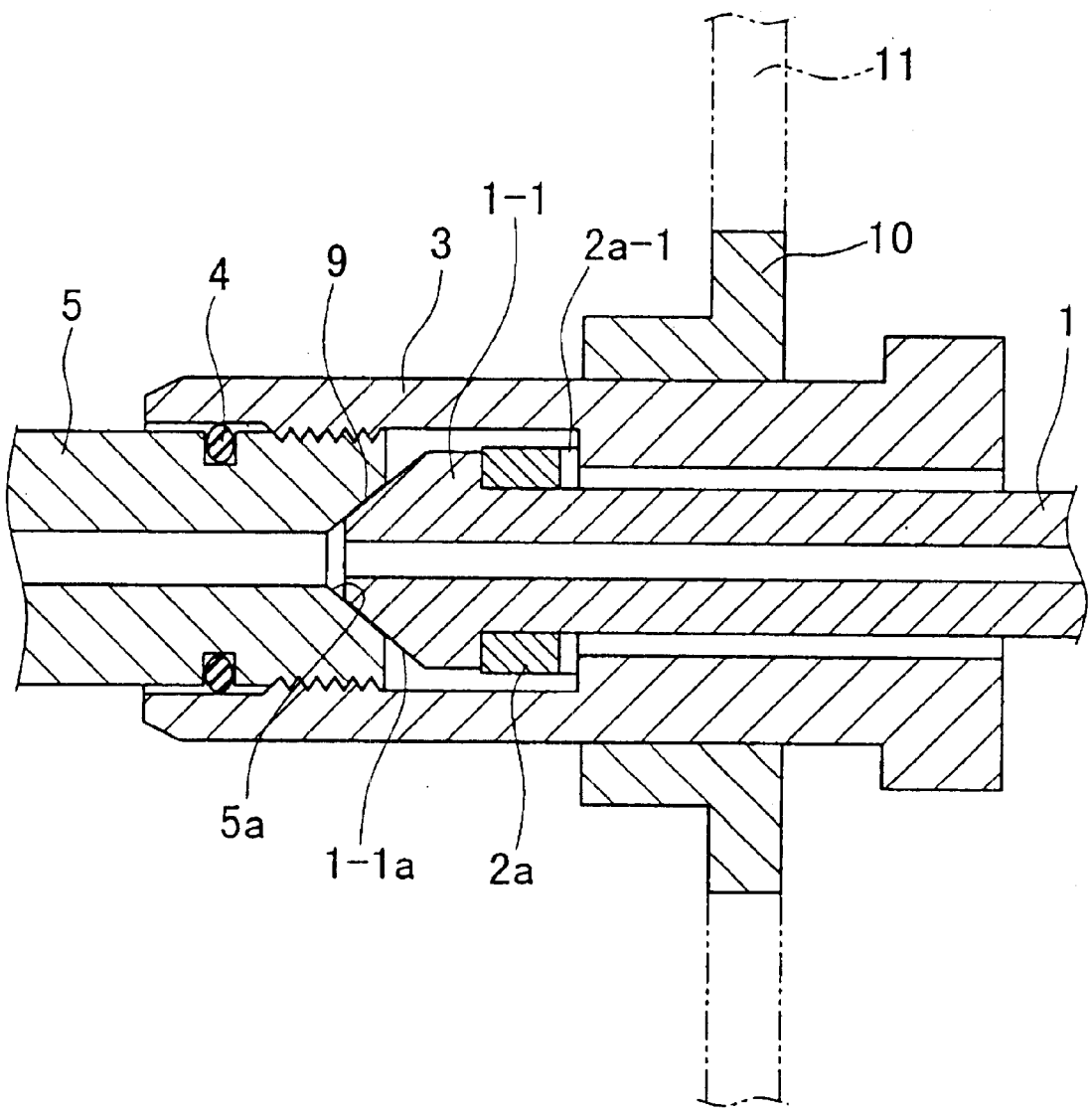
FIG. 1 is a longitudinal cross-sectional view showing an essential part of a high pressure fuel injection pipe for a diesel engine of the first embodiment of the present invention.

Embodiments of the present invention are explained hereinafter in conjunction with attached drawings, FIG. 1 to FIG. 8. In these drawings, numeral 1 indicates an injection pipe body, numeral 1-1 indicates a connecting head, numerals 2a, 2b, 2c indicate annular washers as press members, numeral 3 indicates a fastening nut in a hole-bolt shape, numeral 4 indicates an O-ring for sealing, numeral 5 indicates a nozzle holder as a counterpart member, numerals 7-1 to 7-4 indicate through holes. numeral 8 indicates a radially extending groove, numeral 9 indicates a seat portion, and numeral 10 indicates a seal member, and numeral 11 indicates a head cover.

FIGS. 1–9 show respectively the high pressure fuel injection pipe wherein the washer (press member) is disposed behind the connecting head of the injection pipe body.

Figure 10:
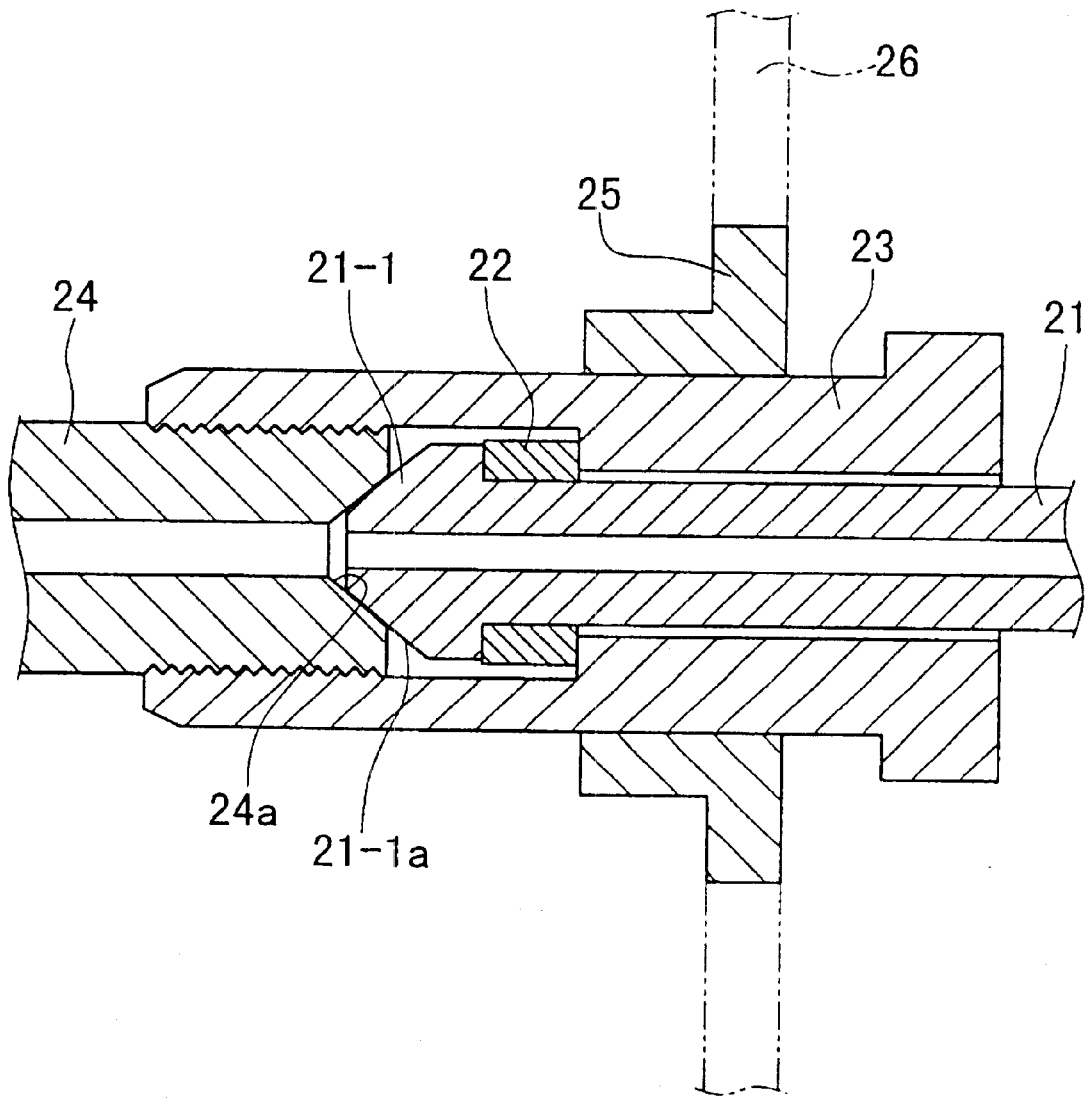
FIG. 10 is a longitudinal cross-sectional view similar to FIG. 1, but showing an example of a conventional high pressure fuel injection pipe for a diesel engine.

FIG. 10 shows the high pressure fuel injection pipe wherein no washer (press member) is provided.

The injection pipe body 1 which is used as a high pressure fuel injection pipe for a diesel engine is a pipe which has a relatively thick thickness with an outer diameter of 6–15 mm and an inner diameter of 1.2–4 mm and is made of a material STS 35, STS 370, STS 410, St 52 or a duplicate pipe which has an inner pipe made of SUS 304 with the abovementioned inner and outer diameters. The injection pipe body I is provided with a press seat portion 1-1a at one end thereof, wherein the press seat portion 1-1a is formed on the connecting head 1-1 having a frontwardly tapered conical shape which is formed by buckling molding and has an enlarged diameter.

Figure 2:
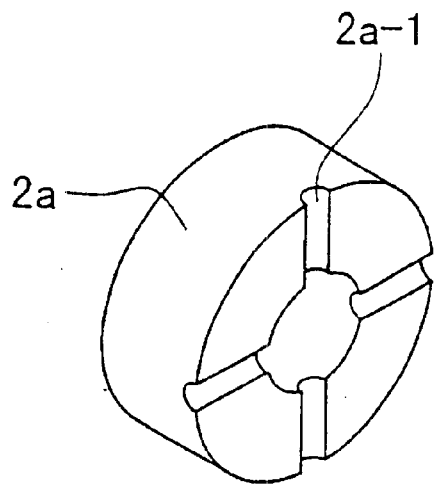
FIG. 2 is a perspective view of a washer used in the fuel injection pipe for a diesel engine shown in FIG. 1.
Figure 3:
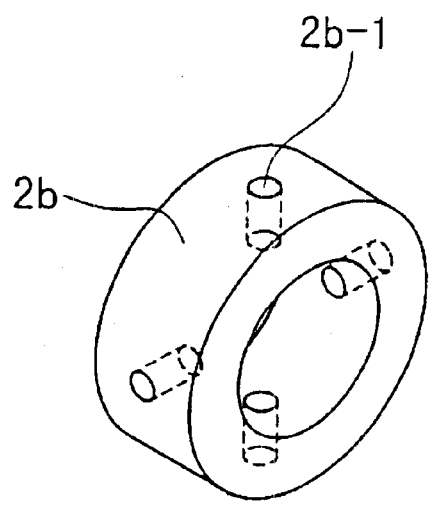
FIG. 3 is a perspective view of another washer used in the fuel injection pipe shown in FIG. 1.

The annular washer 2a disposed behind the connecting head 1-1 of the injection pipe body 1 is constituted such that a plurality of grooves 2a-1 having the arcuate cross-sectional shape are radially formed on a surfaceof the washer 2a opposite to a surface of the washer 2a which comes into contact with the connecting head 1-1 as shown in FIG. 2 in an enlarged manner, Further, the annular washer 2b shown in FIG. 3 is constituted such that a plurality of small holes 2b-1 are radially formed in the peripheral surface of the washer 2b.

The cross-sectional shape of the grooves 2a-1 is not limited to the arcuate shape and may be any arbitrary shape including a V-shape or a rectangular shape.

Further, in the high pressure fuel injection pipe for a diesel engine of the first embodiment shown in FIG. 1, the fastening nut 3 having the hole bolt shape is assembled to the injection pipe body 1 such that the annular washer 2a is disposed behind the connecting head 1-1 formed on the end portion of the injection pipe body 1 with the grooves 2a-1 having the arcuate cross-sectional shape disposed at the side of the annular washer 2a opposite to the side of the annular washer 2a which comes into contact with the connecting head 1-1. Then, the press seat portion 1-1a formed on the connecting head 1-1 of the injection pipe body 1 is brought into contact with and is engaged with a pressure receiving seat portion 5a of the nozzle holder 5 to form the seat portion 9. Along with the pressing of the connecting head 1-1 generated by the threaded engagement of the fastening nut 3 to the nozzle holder 5, the injection pipe body 1 is connected to the nozzle holder 5 by fastening. The O-ring 4 for sealing is packed in the vicinity of an outer end portion of the threaded engagement portion between the fastening nut 3 and the nozzle holder 5.

In the high pressure fuel injection pipe for a diesel engine having the above-mentioned constitution, when the fuel is leaked from the seat portion 9 due to the abnormal condition of the seat face, the shortage of the fastening torque of the fastening nut 3 or the failure to fasten the fastening nut 3, the leaked fuel passes through between the connecting head 1-1 of the injection pipe body 1 and the fastening nut 3 and flows toward the annular washer 2a side. Then, the fuel which flows toward the annular washer 2a side passes through the grooves 2a-1 which have the arcuate cross-sectional shape and are formed in the washer 2a and flows into the inside of the fastening nut 3 and then flows toward the outside of the head cover 11. Accordingly, the leakage of the fuel from the seat portion 9 due to the abnormal condition of the seat face, the shortage of the fastening torque of the fastening nut 3 or the failure to fasten the fastening nut 3 can be promptly detected.

By providing the O-ring 4 for sealing in the vicinity of the outer end portion of the threaded engagement portion defined between the fastening nut 3 and the nozzle holder 5, the fuel which flows into the threaded engagement portion side defined between the fastening nut 3 and the nozzle holder 5 (the inside of the head cover) can be completely prevented from being leaked into the inside of the head cover 11.

Figure 4:
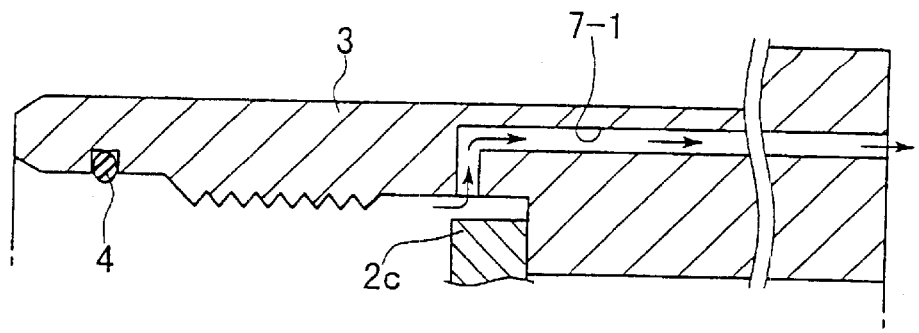
FIG. 4 is a longitudinal cross-sectional view showing an essential part of a high pressure fuel injection pipe for a diesel engine of the second embodiment of the present invention.

Subsequently, in the high pressure fuel injection pipe for a diesel engine of the second embodiment shown in FIG. 4, as means for leading the fuel leaked from the seat portion 9 to the outside of the head cover 11, the through hole 7-1 is formed between an inner peripheral surface of the fastening nut 3 in the vicinity of the connecting head 1-1 of the injection pipe body 1 and the outer end portion of the fastening nut 3. Due to such a constitution, the fuel leaked from the seat portion 9 is led to the outside of the head cover 11 through this through hole 7-1. In this case, and annular washer 2c may not be provided with an arc-shaped groove or a thin hole 2b-1.

Figure 5:
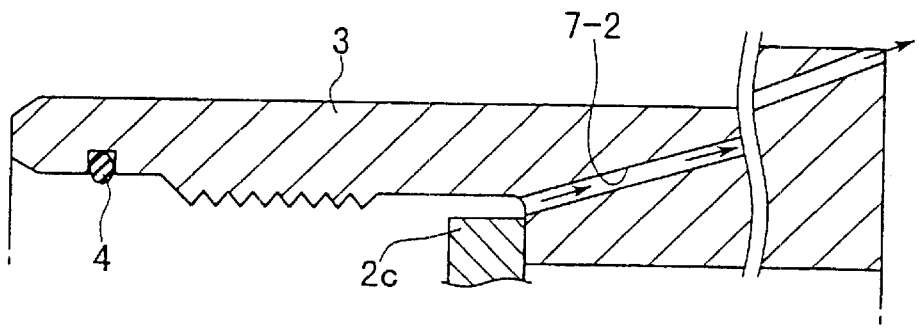
FIG. 5 is a longitudinal cross-sectional view showing an essential part of a high pressure fuel injection pipe for a diesel engine of the third embodiment of the present invention.
Figure 6:
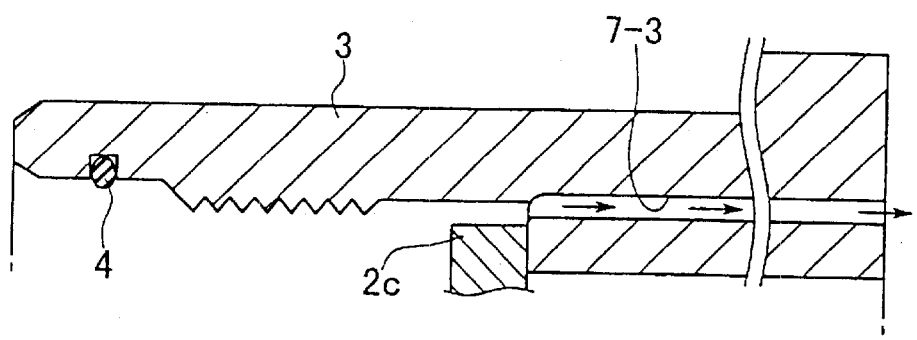
FIG. 6 is a longitudinal cross-sectional view showing an essential part of a high pressure fuel injection pipe for a diesel engine of the fourth embodiment of the present invention.

Further, in the high pressure fuel injection pipes for a diesel engine of the third and fourth embodiments shown in FIG. 5 and FIG. 6, as means for leading the fuel leaked from the seat portion 9 to the outside of the head cover 11, the through holes 7-2, 7-3 are respectively formed between the inner peripheral surface of the fastening nut 3 in the vicinity of the connecting head 1-1 of the injection pipe body 1 and the outer end portion of the fastening nut 3. Due to such constitutions, the fuel leaked from the seat portion 9 is led to the outside of the head cover 11 through these through holes 7-2, 7-3.

Figure 7:
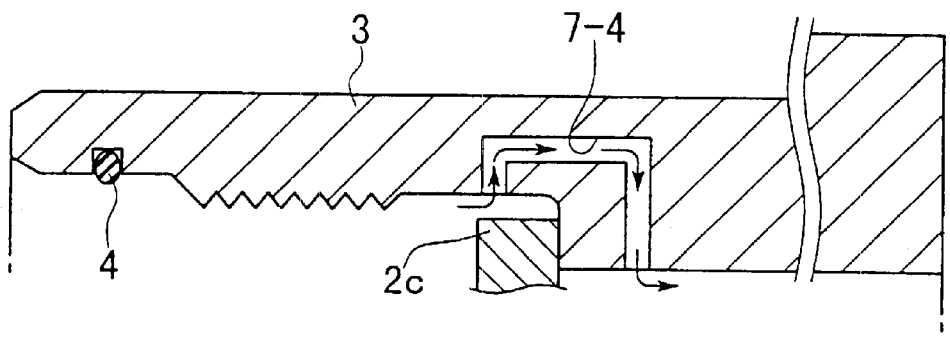
FIG. 7 is a longitudinal cross-sectional view showing an essential part of a high pressure fuel injection pipe for a diesel engine of the fifth embodiment of the present invention.

Further, in the high pressure fuel injection pipe for a diesel engine of the fifth embodiment shown in FIG. 7, as means for leading the fuel leaked from the seat portion 9 to the outside of the head cover 11, the through hole 7-4 is formed between the inner peripheral surface of the fastening nut 3 in the vicinity of the connecting head 1-1 of the injection pipe body 1 and a gap defined between the fastening nut 3 at the back surface side of the annular washer 2c and the injection pipe body 1. Due to such a constitution, the fuel leaked from the seat portion 9 is led to the outside of the head cover 11 through this through hole 7-4 and a gap defined between the fastening nut 3 and the injection pipe body 1.

Figure 8:
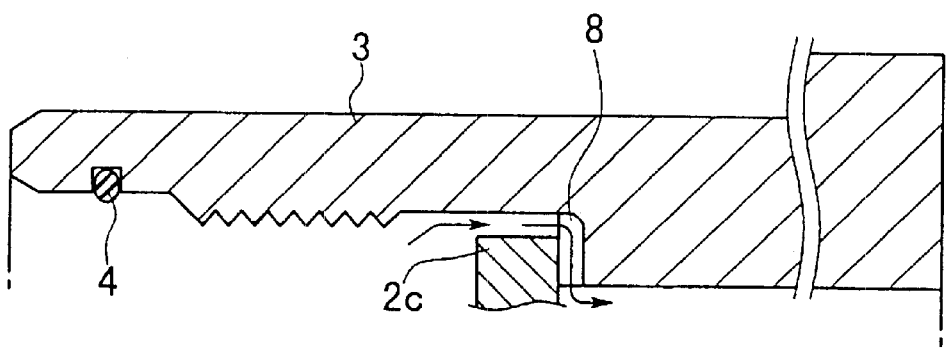
FIG. 8 is a longitudinal cross-sectional view showing an essential part of a high pressure fuel injection pipe for a diesel engine of the sixth embodiment of the present invention.

In the high pressure fuel injection pipe for a diesel engine of the sixth embodiment shown in FIG. 8, as means for leading the fuel leaked from the seat portion 9 to the outside of the head cover 11, the radially extending groove 8 is formed in a stepped portion of the fastening nut 3 with which the back surface of the annular washer 2c is engaged. Due to such a constitution, the fuel leaked from the seat portion 9 is made to flow out to the back surface side of the annular washer 2c through this radially extending groove 8 and is led to the outside of the head cover 11.

Figure 9:
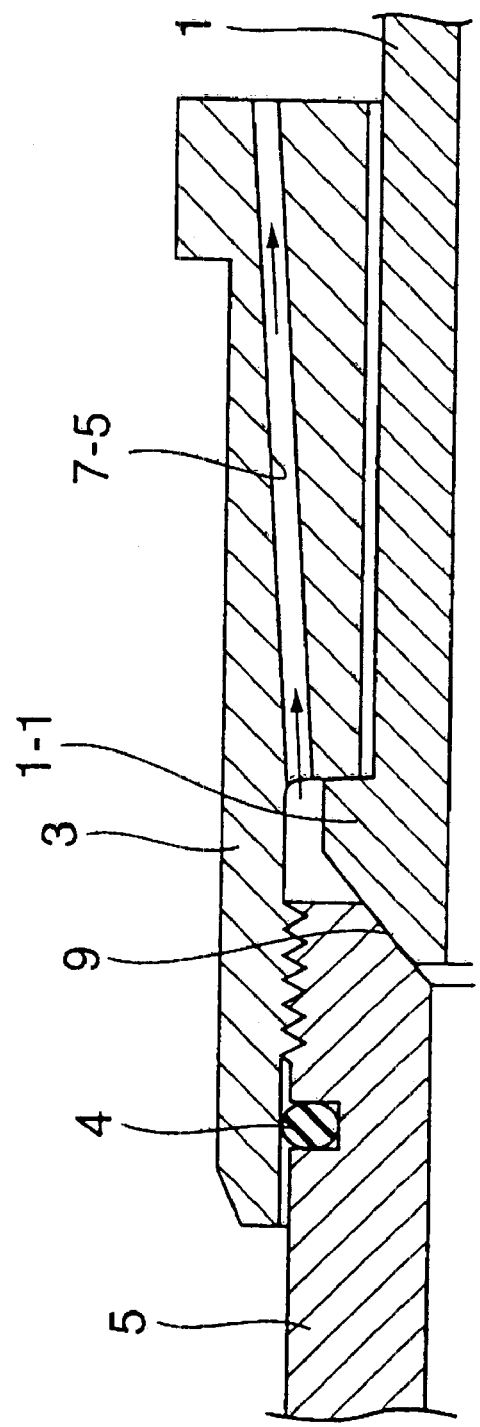
FIG. 9 is a longitudinal cross-sectional view showing an essential part of a high pressure fuel injection pipe for a diesel engine of the seventh embodiment of the present invention.

The high pressure fuel injection pipe for a diesel engine as shown in FIG. 9 is an embodiment of the fuel injection pipe having no washer (press member). In such the fuel injection pipe, the injection pipe body 1 is connected to the nozzle holder 5 by fastening with a pressing force applied to the connecting head due to the threaded engagement of the fastening nut and as a means for discharging a fuel leaked from the seat portion 9 to the outside of the head cover 11 a through hole 7-5 is formed between the inner peripheral surface of the fastening nut 3 near the connecting head 1-1 of the injection pipe body 1 and the outer end part of the fastening nut 3 so that the fuel leaked from the seat portion 9 may be discharged to the outside of the head cover 11 through the through hole 7-5.

Although the annular washers 2c used in the high pressure fuel injection pipes for a diesel engine shown in FIG. 4 to FIG. 8 are of the normal type, no problem arises in using the annular washers 2a, 2b of the present invention shown in FIG. 2 and FIG. 3 in place of the washer 2c.

As has been described heretofore, in the high pressure fuel injection pipe for a diesel engine according to the present invention, the annular washer having the radially extending groove or small hole is used as the press member interposed between the connecting head of the injection pipe body and the fastening nut, or the through hole is formed in the fastening nut per se and hence, the fuel leaked from the seat face defined between the press seat portion of the connecting head of the injection pipe body and the pressure receiving seat portion of the nozzle holder as the counterpart member is led toward the outside of the head cover. Accordingly, the following effect can be obtained. That is, the leakage or the fuel caused by the abnormal condition of the seat face, the shortage of the fastening torque of the fastening nut or the failure to fasten the fastening bolt can be instantly detected in a trial running after assembling of an engine so that the countermeasure against the leakage of the fuel can be taken promptly and the degrading of the quality of the engine oil due to the leaked fuel, the generation of the white smoke in the exhaust gas due the elevation of the oil level and the increase of toxic substances in the exhaust gas can be prevented preliminarily.

What is claimed is:

1. A high pressure fuel injection pipe for a diesel engine which is constituted such that an injection pipe body is provided with a connecting head at an end portion thereof and a fastening nut is assembled to the injection pipe body by way of a press member which is disposed behind the connecting head, and a press seat portion formed on the connecting head of the injection pipe body is brought into contact with and is engaged with a pressure receiving seat portion of a counterpart member, and the injection pipe body is connected to the counterpart member by fastening with a pressing force applied to the connecting head due to threaded engagement of the fastening nut with the counterpart member, wherein the improvement is characterized by being constituted such that an annular washer provided with at least one recessed groove or one small hole which extends in the radial direction on a circumference thereof is used as the press member which is interposed between the connecting head of the injection pipe body and the fastening nut, and fuel leaked into the inside of the fastening nut from a seat portion defined between the press seat portion formed on the connecting head and the pressure receiving seat portion of the counterpart member is led to the outside of the fastening nut through the recessed groove or the small hole of the washer.

2. A high pressure fuel injection pipe for a diesel engine according to claim 1, wherein a seal member is disposed in the vicinity of an outer end portion of a threaded engagement portion between the fastening nut and the counterpart member.

3. A high pressure fuel injection pipe for a diesel engine which is constituted such that an injection pipe body is provided with a connecting head at an end portion thereof and a fastening nut is assembled to the injection pipe body by way of a press member which is disposed behind the connecting head, and a press seat portion formed on the connecting head of the injection pipe body is brought into contact with and is engaged with a pressure receiving seat portion of a counterpart member, and the injection pipe body is connected to the counterpart member by fastening with a pressing force applied to the connecting head due to threaded engagement of the fastening nut with the counterpart member, wherein the improvement is characterized by being constituted such that a through hole or a radially extending groove for leading fuel leaked into the inside of the fastening nut from a seat portion defined between the press seat portion formed on the connecting head and the pressure receiving seat portion of the counterpart member to the outside of the fastening nut is formed in the fastening nut in the vicinity of the press member.

4. A high pressure fuel injection pipe for a diesel engine according to claim 3, wherein, a seal member is disposed in the vicinity of an outer end portion of a threaded engagement portion between the fastening nut and the counterpart member.

5. A high pressure fuel injection pipe for a diesel engine comprising an injection pipe body with a connecting head at one end, a press seat portion formed on the connecting head of the injection pipe body, a fastening nut being assembled onto the connecting head, a counterpart member having a pressure receiving seat portion, the press seat portion of the injection pipe body being brought into contact with and engaged with the pressure receiving seat portion of the counterpart member by fastening with a pressing force applied to the connecting head due to threaded engagement of the fastening nut with the counterpart member, characterized in that a through hole is formed through the fastening nut, the through hole having an entry end disposed for a fuel leaked between the press seat portion formed on the connecting head and the pressure receiving seat portion of the counterpart member, the through hole further having an exit end on an axial end of the fastening nut remote from the counterpart member.

* * * * *